Patented May 15, 1951

2,553,506

UNITED STATES PATENT OFFICE 2,553,506

HARDENED GELATINO-SILVER HALIDE EMULSION

Fritz W. H. Mueller and Benjamin R. Harriman, Binghamton, N. Y., assignors to General Aniline & Film Corporation, New York, N. Y., a corporation of Delaware No Drawing. Application December 10, 1946, Serial No. 715,348

4 Claims. (Cl. 95—7)

The present invention relates to the hardening of gelatin and is particularly directed to the hardening of gelatin and like emulsions employed as an emulsion layer in photographic films, plates, or papers.

It is common practice to harden photographic gelatin emulsion layers by incorporating in the emulsion a minor amount of a material known to have the property of overcoming the tendency of gelatin to melt or swell during processing, particularly at elevated temperatures. The materials most commonly employed for this purpose are chrome alum or acetate and various aldehydes, particularly formaldehyde.

As is well-known in the photographic field, gelatin is widely employed in the preparation of photographic films, plates, or paper in the form of gelatin emulsions. In addition, layers of gelatin dispersions are coated on the photographic films, plates, papers, and the like, to serve as antihalation layers, to act as filter layers, to separate two sensitized layers and for numerous other purposes.

In order to permit the photographic materials which are coated with layers of gelatin dispersions to be satisfactorily processed at even slightly elevated temperatures, for instance in a warm climate, it is necessary to incorporate in the gelatin some material which will overcome the tendency of the gelatin to melt or swell.

Compounds which have been used for hardening gelatin as such or in silver-halide emulsions are formaldehyde and phenol (German Patent 519,794), aliphatic dialdehydes, such as glyoxal (U. S. 1,870,354), and aliphatic aldehydes such as formaldehyde, aldol, glycol aldehyde, and the like, with an aromatic compound containing at least one nuclear hydroxy substituent group such as phenol, resorcinol, resorcylic aldehyde, and the like (U. S. 2,165,421). Although aliphatic aldehydes and dialdehydes are satisfactory as hardening agents, these compounds possess the undesirable property of producing excessive fog, desensitization, or flattening of gradation in the processed film. Any hardeners that function by the liberation of formaldehyde will also have these deleterious effects as well as that of "after-hardening," i. e., hardening continues through a period of months and may surpass in degree the initial hardening on first drying. Although aliphatic aldehydes, with an aromatic compound containing at least one nuclear hydroxy substituent, induce an increase in the melting point, diminish after-hardening, and reduce fog, they invariably cause loss in speed and gradation so that one has to make a compromise between hardening and speed. When aliphatic aldehydes with hydroxy-benzenes are used, only relatively weak hardening can be achieved without causing deleterious effects in the photographic characteristics of the emulsion.

It is an object of the present invention to provide a photographic gelatin or a gelatino silverhalide emulsion having an appreciable increase in melting point and good stability on ageing, as compared to the original gelatin or gelatino silver-halide emulsion.

Another object is to provide gelatin layers and gelatino silver-halide emulsion layers in which the gelatin is not subject to the phenomenon known as "after-hardening."

A further object is to provide a gelatino silverhalide emulsion which will not fog on storage.

A still further object is to provide a gelatino silver-halide emulsion which will be resistant to relatively high processing temperatures without fogging, loss of speed, and loss of gradation.

Other objects will appear hereinafter.

The foregoing objects are accomplished, according to the present invention, by incorporating in the gelatin or gelatino silver-halide emulsion, glyoxal and 2,4-dihydroxy benzaldehyde (resorcylic aldehyde), with or without the presence of an aromatic compound containing at least two nuclear hydroxy substituent groups, hereinafter referred to as a polyhydroxy benzene, such as 1,3-benzenediol (resorcinol), phloroglucinol, methyl phloroglucinol, pyrogallol, 1,2,4-trihydroxy benzene (oxy-hydroquinone), salicylaldehyde, and the like, or mixtures thereof.

The incorporation into a gelatino silver-halide emulsion of glyoxal without 2,4-dihydroxy benzaldehyde and a polyhydroxy benzene, although giving an increase in melting point, causes a loss in speed and gradation of the photographic emulsion. A combination of glyoxal and 2,4-dihydroxy benzaldehyde increases the melting point without "after-hardening", and without impairing photographic properties, particularly as regards fog formation.

It appears that the 2,4-dihydroxy benzaldehyde functions in the combination to boost or accelerate the hardening action of glyoxal and to restrain the fog. The 2,4-dihydroxy benzaldehyde is, in short, a necessary element, since without it not only does the phenomenon of "after-hardening" manifest itself, but in addition the photographic characteristics are so reduced as to render the final product impractical.

The mixture of glyoxal and the aforesaid benzaldehydes are adequate where only hardening without "after-hardening" concomitant with retention of the desired photographic properties are desired. This is particularly true where the hardness is desired in a gelatin layer other than that bearing the photo-sensitive elements. However, we have found that where it is desired not only to effect hardening without "after-hardening" and simultaneously improve markedly the photographic properties of the involved gelatin layers, especially those bearing the light-sensitive salts, particularly as regards their stability with respect to fog, speed, and gradation upon long storage or incubation, it is necessary to also add with the above ingredients, a polyhydroxy benzene, such as those given above. The particular role played by the polyhydroxy benzene is not ascertainable, but is undoubtedly attributable to a mutual interaction of the glyoxal and the 2,4-dihydroxy benzaldehyde. Thus, it may be noted that whereas when employing a nitro alcohol as the primary hardener only resorcinol can be used as the polyhydroxy benzene (see the co-pending application, filed of even date, now United States Patent 2,494,055 of January 10, 1950, entitled "Hardening of Photographic Gelatin and Emulsions With Nitro Alcohols," of Bernard A. Orkin). When using glyoxal any of the polyhydroxy benzenes may be employed. This bespeaks of some specific coaction between the primary hardener, the 2,4-dihydroxy benzaldehyde, and the polyhydroxy benzene in each case to which the valuable results noted must be assigned. The quantities of the ingredients may vary depending upon the degree of hardness desired, but it is recommended that the ratio of the weight of glyoxal to 2,4-dihydroxy benzaldehyde be from 1:1 to 1:10, and the ratio of polyhydroxy benzene to the glyoxal and 2,4-dihydroxy benzaldehyde mixture may be from 1:20 to 1:0.2. For non-curling layers and anti-halation or anti-abrasion layers, we prefer to use from 0.05 to 0.5% of glyoxal and from 0.05 to 5.0% of 2,4-dihydroxy benzaldehyde based on the dry weight of gelatin in the composition. In these concentrations, effective hardening of the gelatin is obtained without "after-hardening," i. e., the melting point of the gelatin in the composition does not vary with time or with long periods of storage prior to actual use and processing of the photographic material provided with such a layer.

In hardening gelatin emulsions which are acid or slightly alkaline, i. e., emulsions having a pH greater than 7, generally between 7 and 8.5, the amounts of glyoxal and 2,4-dihydroxy benzaldehyde employed are the same as for the non-curling, anti-halation layer, etc., and the amount of a polyhydroxy benzene may vary from 0.005% to 5% based on the weight of the dry gelatin in the emulsion.

From the foregoing listing of polyhydroxy benzenes, we prefer to use resorcinol in conjunction with glyoxal and 2,4-dihydroxy benzaldehyde for the following reasons: (1) it is inexpensive, (2) it can be obtained in such a state of high purity that it does not stain gelatin, and (3) it can replace the more expensive 2,4-dihydroxy benzaldehyde to about 80 to 90% without impairing the additional hardening boost that 2,4-dihydroxy benzaldehyde imparts to glyoxal. In addition to these properties, resorcinol has a stabilizing effect all of its own, and if used alone with glyoxal, it gives an appreciable hardening boost, but not of the magnitude given by 2,4-dihydroxy benzaldehyde or in a mixture with 2,4-dihydroxy benzaldehyde.

Where it is desired to increase the gradation of a gelatino silver-halide emulsion, we prefer to use phloroglucinol in conjunction with glyoxal and 2,4-dihydroxy benzaldehyde.

The following examples describe in detail the methods for accomplishing the above objects, but it is to be understood that they are inserted merely for the purpose of illustration and are not to be construed as limiting the scope of the invention.

*Example I*

To one kilogram of a gelatin anti-halation composition containing 10% gelatin and melting at 35° C., there were added 1.0 gram of glyoxal and 1.0 gram of 2,4-dihydroxy benzaldehyde, and the mixture heated at 45-50° C., for several minutes. The composition was coated on a glass plate and dried at room temperature. After 1 month of storage at room temperature (23-4° C.) the melting point of the gelatin was 82° C. The coating is resistant to abrasion and reticulation when immersed in processing solutions at elevated temperatures, i. e., up to about 45-50° C.

*Example II*

To 1 kilogram of an acid type photographic silver-halide emulsion containing 8-10% gelatin and melting at 35° C., there were added 0.1 gram of glyoxal, 0.36 gram of resorcinol, and 0.04 gram of 2,4-dihydroxy benzaldehyde, and the mixture heated at 45-50° C., for several minutes. A glass plate was coated with a thin layer of this emulsion mixture and dried at room temperature. After 1 month of normal storage, the emulsion layer melted at 42° C., and possessed photographic properties equal to those of the control film containing no hardeners.

*Example III*

To 1 kilogram of an acid type photographic silver-halide emulsion containing 8-10% gelatin and melting at 37° C., there were added 0.075 gram of glyoxal and 0.3 gram of 2,4-dihydroxy benzaldehyde, and the mixture heated at 50° C., for several minutes. A glass plate was coated with a thin layer of this emulsion and dried at room temperature. After 1 month of normal storage, the emulsion layer melted at 44° C., and the film was tougher and had less fog than the control film containing only glyoxal for hardening.

*Example IV*

To 1 kilogram of an acid type photographic silver-halide emulsion containing 8-10% gelatin and melting at 35° C., there were added 0.12 gram of glyoxal, 0.6 gram of resorcinol, 0.06 gram of 2,4-dihydroxy benzaldehyde, and 0.006 gram of phloroglucinol, and the mixture heated at 45-50° C., for several minutes. A glass plate was coated with a thin layer of this emulsion mixture and dried at room temperature. After 1 month, the film had a 10° C. higher melting point and was photographically equal to an unhardened film.

*Example V*

To 1 kilogram of an ammonia type photographic silver-halide emulsion containing 8-10% gelatin and melting at 35° C., there were added 0.075 gram of glyoxal, 0.3 gram of resorcinol, and 0.075 gram of 2,4-dihydroxy benzaldehyde, and the mixture heated at 45-50° C., for several minutes. A glass plate was coated with a thin layer of this emulsion mixture and dried at room temperature. After 2 weeks, the film better withstood high temperature processing, yet was also photographically better than the control film containing only glyoxal for hardening.

We claim:

1. A photo-sensitive element containing a photographic gelatino silver halide emulsion layer hardened by means of a mixture consisting of glyoxal, 2,4-dihydroxy benzaldehyde and a polyhydroxybenzene.

2. A photo-sensitive element containing a photographic gelatino silver halide emulsion layer hardened by means of a mixture consisting of glyoxal, 2,4-dihydroxy benzaldehyde and resorcinol.

3. A photo-sensitive element containing a photographic gelatino silver halide emulsion layer hardened by means of a mixture consisting of glyoxal, 2,4-dihydroxy benzaldehyde and phloroglucinol.

4. A photo-sensitive element containing a photographic gelatino silver halide emulsion layer hardened by means of a mixture consisting of glyoxal, 2,4-dihydroxy benzaldehyde and methyl phloroglucinol.

FRITZ W. H. MUELLER.
BENJAMIN R. HARRIMAN.

REFERENCES CITED

The following references are of record in the file of this patent:

UNITED STATES PATENTS

| Number | Name | Date |
|---|---|---|
| 1,870,354 | Brunken | Aug. 9, 1932 |
| 2,165,421 | Sheppard et al. | July 11, 1939 |